(12) United States Patent
Hannum et al.

(10) Patent No.: US 8,943,537 B2
(45) Date of Patent: Jan. 27, 2015

(54) METHOD AND SYSTEM FOR PRESENTING PERSONALIZED TELEVISION PROGRAM RECOMMENDATION TO VIEWERS

(75) Inventors: Sandra A. Hannum, Philadelphia, PA (US); Peter Sheedy, Huntingdon Valley, PA (US); James R. Albrecht, Girdwood, AK (US); Bruce R. Bradley, Wayne, PA (US); Matt Wong, Palo Alto, CA (US)

(73) Assignee: Cox Communications, Inc., Atlanta, GA (US)

( * ) Notice: Subject to any disclaimer, the term of this patent is extended or adjusted under 35 U.S.C. 154(b) by 1244 days.

(21) Appl. No.: 11/186,413

(22) Filed: Jul. 21, 2005

(65) Prior Publication Data

US 2006/0020973 A1    Jan. 26, 2006

Related U.S. Application Data

(60) Provisional application No. 60/590,068, filed on Jul. 21, 2004.

(51) Int. Cl.
G06F 3/00 (2006.01)
H04N 5/445 (2011.01)
H04N 7/16 (2011.01)
H04N 21/25 (2011.01)
H04N 21/431 (2011.01)
H04N 21/442 (2011.01)
H04N 21/45 (2011.01)
H04N 21/466 (2011.01)
H04N 21/475 (2011.01)
(Continued)

(52) U.S. Cl.
CPC ........... *H04N 5/44543* (2013.01); *H04N 7/163* (2013.01); *H04N 21/252* (2013.01); *H04N 21/4314* (2013.01); *H04N 21/44222* (2013.01); *H04N 21/4532* (2013.01); *H04N 21/4668* (2013.01); *H04N 21/4755* (2013.01); *H04N 21/482* (2013.01); *H04N 21/4821* (2013.01); *H04N 21/6581* (2013.01); *H04N 21/6582* (2013.01)
USPC ........................................................... 725/46

(58) Field of Classification Search
CPC .................... H04N 21/4532; H04N 21/44222; H04N 21/482; H04N 5/44543; H04N 7/163
USPC ................................................. 725/46, 9–13
See application file for complete search history.

(56) References Cited

U.S. PATENT DOCUMENTS 5,758,257 A * 5/1998 Herz et al. ..................... 725/116
6,425,128 B1 * 7/2002 Krapf et al. ..................... 725/37
6,463,585 B1 * 10/2002 Hendricks et al. .............. 725/35

(Continued)

FOREIGN PATENT DOCUMENTS

WO    WO00/40027    *    7/2000

OTHER PUBLICATIONS

WO2004053736.*

(Continued)

*Primary Examiner* — Benjamin R Bruckart
*Assistant Examiner* — Anthony Bantamoi
(74) *Attorney, Agent, or Firm* — Merchant & Gould P.C.

(57) ABSTRACT

A novel electronic program guide (EPG) based method and system provides viewer/user groups with an improved program recommendation feature for predicting programs that are likely to be of interest.

16 Claims, 5 Drawing Sheets

(51) Int. Cl.
*H04N 21/482* (2011.01)
*H04N 21/658* (2011.01)

(56) References Cited

U.S. PATENT DOCUMENTS

| | | | |
|---|---|---|---|
| 6,530,083 B1* | 3/2003 | Liebenow | 725/46 |
| 6,704,931 B1* | 3/2004 | Schaffer et al. | 725/46 |
| 7,051,352 B1* | 5/2006 | Schaffer | 725/39 |
| 7,140,032 B2* | 11/2006 | Dew et al. | 725/46 |
| 7,231,652 B2* | 6/2007 | Gutta et al. | 725/46 |
| 7,784,078 B2* | 8/2010 | Ohnuma et al. | 725/91 |
| 7,873,798 B2* | 1/2011 | Miyazaki et al. | 711/154 |
| 2002/0112239 A1* | 8/2002 | Goldman | 725/46 |
| 2002/0174428 A1* | 11/2002 | Agnihotri et al. | 725/46 |
| 2003/0084450 A1* | 5/2003 | Thurston et al. | 725/46 |
| 2003/0110492 A1* | 6/2003 | Thurston et al. | 725/39 |
| 2003/0237093 A1* | 12/2003 | Marsh | 725/46 |
| 2004/0003392 A1* | 1/2004 | Trajkovic et al. | 725/10 |
| 2004/0055008 A1* | 3/2004 | Ikeda | 725/46 |
| 2004/0073921 A1* | 4/2004 | Neely et al. | 725/45 |
| 2005/0160458 A1* | 7/2005 | Baumgartner | 725/46 |
| 2006/0156326 A1* | 7/2006 | Goronzy et al. | 725/13 |
| 2009/0307726 A1* | 12/2009 | Levin et al. | 725/46 |

OTHER PUBLICATIONS

Masthoff, Judith, (2004). Group modeling: Selecting a sequence of television items to suit a group of viewers User Modeling and User Adapted Interaction, 14, pp. 37-85.

* cited by examiner

INTERACTIVE PROGRAM GUIDE

GROUP RECOMMENDATIONS:

| CHANNEL | 7:30 | 8:00 | 8:30 | 9:00 | 9:30 |
|---|---|---|---|---|---|
| 6 ABC | HOLLYWOOD ACCESS | FRIENDS | | WILL & GRACE | |
| 7 RTS | SEINFELD | SMALLVILLE | | SMALLVILLE | |
| 13 FOX | WHITE OLEANDER | | | PARENTHOOD | |
| 41 COM | MAD TV | CRANK YANKERS | | INSOMNIAC WITH DAVE | |
| 44 A&E | MY LIFE: BIOGRAPHY | I LOVE LUCY | | MASH | |
| 48 TBS | FRIENDS | SEINFELD | SEINFELD | SEX & THE CITY | |
| 301 HBO | DENNIS MILLER | OLD SCHOOL | | | XXX |

GO BACK    MAIN

INTERACTIVE PROGRAM GUIDE

GROUP RECOMMENDATIONS:

| CHANNEL | 7:30 | 8:00 | 8:30 | 9:00 | 9:30 |
|---|---|---|---|---|---|
| 6 ABC | | FRIENDS | | WILL & GRACE | |
| 41 COM | MAD TV | CRANK YANKERS | | INSOMNIAC WITH DAVE | |
| 44 A&E | | I LOVE LUCY | | MASH | |
| 48 TBS | | SEINFELD | SEINFELD | | |
| 301 HBO | | OLD SCHOOL | | | |

( GO BACK )  ( MAIN )

FIG. 4

INTERACTIVE PROGRAM GUIDE

GROUP RECOMMENDATIONS:

| CHANNEL | 8:00 | 8:30 | 10:00 | 10:30 | 12:00 |
|---|---|---|---|---|---|
| 6 ABC | FRIENDS | | WILL & GRACE | | |
| 41 COM | CRANK YANKERS | | INSOMNIAC WITH DAVE | | |
| 44 A&E | I LOVE LUCY | | MASH | | |
| 48 TBS | SEINFELD | SEINFELD | | | SOAP |
| 301 HBO | OLD SCHOOL | | | | |

( GO BACK )   ( MAIN )

METHOD AND SYSTEM FOR PRESENTING PERSONALIZED TELEVISION PROGRAM RECOMMENDATION TO VIEWERS

CROSS-REFERENCE TO RELATED APPLICATIONS

This application claims the benefit of U.S. Provisional Application Ser. No. 60/590,068, filed on Jul. 21, 2004, entitled "Television Processing Methods," which is incorporated herein by reference in its entirety.

BACKGROUND OF THE INVENTION

1. Field of the Invention

The present invention generally relates to helping a group of television viewers select programming appropriate to the group.

2. Background

Electronic Program Guides (EPGs) are special graphical user interfaces (GUIs) that allow users to navigate through a multitude of programs available for viewing or reproduction. Many EPGs present one or more layered displays—often available on a dedicated television channel—to give a user an inventory of programs available for viewing or reproduction, as well as schedules and other details (e.g., channels, program length, program synopsis, etc.) about the programs. Pointing devices are often used to control and navigate within the displays, as well as to activate links to the programs of interest. EPGs are especially useful for television viewers who receive a great deal of television stations, as is increasingly the case with cable and satellite television subscribers.

Some of the Electronic Program Guide literature has begun to disclose EPGs that use a set-top box to keep a viewing history of the associated user. It has been proposed that the viewing history stored in the set-top box be used to recommend programs that might be of interest to the user in his or her current viewing session. For example, if the viewing history indicates that motion pictures of the "western" genre have been frequently viewed, the EPG might find western movies which are currently playing or scheduled to play in the future to list (e.g., in order of most to least likely to be of interest) for the user in either a Recommended Programs area or in a separate display.

Unfortunately, within the context of a group of viewers the existing problems of content selection are exacerbated by the need for the group, such as a family or household, to select programming that is at least tolerable to the members of the group.

SUMMARY OF THE INVENTION

Various deficiencies of the prior art are addressed by a program navigation method for enabling a user to locate and link to programs, the user being a member of a group of users, the method comprising: utilizing programming preferences of each member of the group to determine a group profile; determining programming recommendations according to the group profile; and adapting an electronic program guide (EPG) page in response to the determined program recommendations.

BRIEF DESCRIPTION OF THE DRAWING

Features and advantages of the present invention will become apparent to those skilled in the art from the description below, with reference to the following drawing figure, in which:

FIGS. 2-5 depict exemplary imagery associated with an electronic program guide (EPG) according to various embodiments of the invention.

DESCRIPTION OF THE PREFERRED EMBODIMENTS

Figure 1:
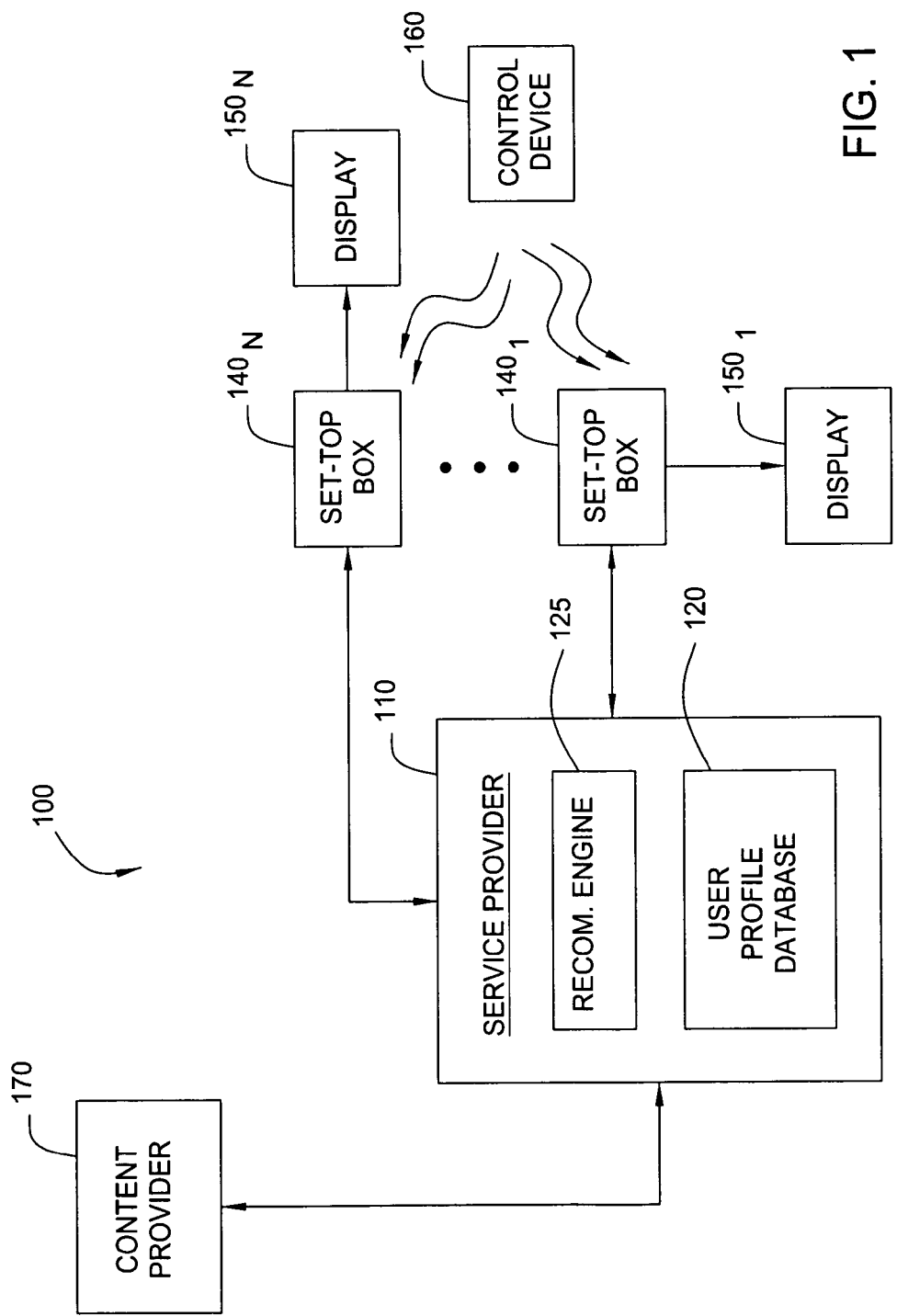
FIG. 1 depicts a block diagram of a system according to an embodiment of the invention.

An Electronic Program Guide (EPG) in accordance with an embodiment of the present invention provides a viewer/user with a list of recommended programs which has been constructed by a Service Provider and downloaded to the user's set-top box (or equivalent). The set-top box stores a User Profile with information about the viewer/user having dominion over the set-top box. The user can be an individual, or more than one, such as a family.

As an example, the recommended program list for a mid-twenties male with interests in sports, reality television, action-dramas, and comedies might be:

1. Sopranos
2. Real World
3. Monday Night Football
4. American Pie
5. Law & Order The User Profile contains user identification or characteristic information, along with viewing history information. The viewer characteristic information can include the age of the viewer or age range of viewers, geographic location, gender, as well as some user-input preferences, such as program genres of interest, program ratings (e.g., MPAA rating system ratings) of interest, time preferences, program descriptions of interest or keywords or keyword combinations of program descriptions of interest, and others.

The viewing history information is a matter of design choice; however, in the preferred embodiment, the viewing history can include, for example, the previous 200 programs viewed. The programs can also be conveniently grouped according to genre, program description, and other characteristics.

Periodically or upon demand, user profiles for all of the viewers/users in the system are uploaded to the Service Provider. Either as a matter of default, or upon request by a user, the EPG can display a list of recommended programs predicted to be of interest to the user or users serviced by a set-top box. The recommended programs list is generated by the Service Provider and transmitted to the user's set-top box. The Service Provider generates the list by comparing the User Profile of the requesting viewer/user to that of other User Profiles. The Service Provider then surveys the viewing histories of the User Profiles of viewer/users having similar characteristics to the requesting viewer/user. As a result of the survey, the Service Provider generates a list of recommended programs that have or are likely to appeal to users of similar characteristics, and transmits the list to the requesting viewer/user's set-top box.

In a related alternate embodiment, the Service Provider modifies or otherwise adapts the recommended programs list by listing programs according to agreement with content providers, and optionally unbeknownst to users. For example, a content provider wishing to have his or her program widely viewed can through payment and agreement, have his or her program appear first on the recommended programs list of all of the viewers/users serviced by the Service Provider. The Recommended Programs List can automatically appear on the user's display at the beginning of each viewing session. Users would be more likely to at least initially tune-in to the recommended programs. As an additional value-added service, the Service Provider can highly recommend a particular content provider's program to those users who are more likely to have an interest.

As described herein, the term content provider refers to any entity that provides content or programming, such as a movie studio, television studio, independent film maker, broadcast network, cable television network and the like. Similarly, a the term content distributor refers to any entity that provides a means to distribute content, such as cable television network or channel, a broadcast television network or channel, a cable television company or other network owner and the like.

In one embodiment of the invention, where multiple recommendations are generated by the recommendation engine 125, a bidding process is provided such that the order of presentation to the viewer/user is modified in a manner favorable to the high bidders. A favorable presentation may comprise top placement in a list of the favored programming, highlighting of the favored programming and so on. Thus, in this embodiment of the invention, content providers (such as movie studios, television studios, independent film makers, broadcast networks, cable networks and the like), content distributors (such as cable or broadcast television networks and the like) and other entities may pay money via a bidding process to achieve favorable presentation. The bids may be used to preferentially influence the content listed on the EPG page, the channels listed on the EPG page and so on.

Having provided the general description above, a brief description will now be given of the system with reference to FIG. 1. The system 100 nominally includes a Service Provider 110 and many set-top boxes 140 (shown as set-top boxes $140_1$ through $140_N$) serving system viewers/users. The set-top boxes 140 can be of the variety found in many cable or satellite television systems, with the ability to both receive and transmit information (such as user profiles). The set-top boxes 140 generate the EPGs used by the system, and place the programs received from the Service Provider in a format suitable for display on displays such as the one 150. The system 100 also includes many program sources, such as content provider 170.

Among the many components of the Service Provider function, which are well known to those skilled in the art, are a User Profile database 120 and a recommendation engine 125. The user profile database 120 stores the user profiles of all of the users in the system, as well as group profiles generated using, for example, the recommendation engine. Generally speaking, the recommendation engine aggregates user profiles for the users in a group to determine a group profile. The group profile is then used to select (or filter out) content depending on how well the content conforms to the group profile.

In addition to the foregoing, the system 100 of FIG. 1 is capable of generating recommendations for programs at least in part on the basis of provider- or advertiser-based preferences; i.e., an EPG that enables the system to inject a user-imperceptible preference or "bias" into the recommendation process, in return for payment or other consideration received by the system operators. For example, in exchange for receipt of payments from the Fox Television Network, the EPG might advance television shows from the Fox Network to a higher ordinal position in a list of recommendations to be presented to the television viewer. Alternatively, advancement to a higher ordinal position might occur in response to receipt of payment from a particular sponsor whose advertisements are placed in conjunction with particular television shows (e.g., Anheiser-Busch beer and National Football League television coverage) or programming from a particular network.

Various embodiments of the invention described herein are useful for providing program recommendations based on the profile of a particular user and other uses with similar characteristics. In addition to individual user profiles, various embodiments of the invention provide household or group user profiles, which profiles are useful for providing household or group program recommendations.

In one embodiment of the invention, a recommendation engine 125 is operative at the service provider 110. The recommendation engine utilizes information provided by the set-top box 140 and user profile database 120 to identify programming likely to be of interest to the household or group.

For example, assuming that each of three people in a household or group have a number of differing programming interests (e.g., sports for person A, history for person B and cooking for person C), a common household or group programming interest may be used within the context of a household or group profile (e.g., each of the three persons is interested in comedy). In this example, all of the group members like comedy. Thus, the corresponding group profile exhibits a preference for comedy from each member of the group (e.g., three votes in favor of comedy, one vote for each of the other programming interests). As such, a recommendation of comedy programming is made.

The subject invention is also applicable where such a clear recommendation choice is not available. Specifically, various embodiments of the subject invention adapt the operation of the recommendation engine in response to user weighting, content/programming weighting and the like. Weighting information is provided by, illustratively, prior user history, user responses to specific queries and/or via a profiler screen presented to the use to enable user affirmation of profile/weighting information. A user profile may provide weighting associated with broad categories, such as Action, Adventure, Drama, Comedy and the like. The profile may also provide weighting of directors, actors and various content attributes. Once the recommendation feature of the EPG is invoked, the set-top box transmits, illustratively, a group identity and the desired group weighting or profile to the server for processing be, illustratively, a recommendation engine. The set-top box receives the recommendations and presents them to the user(s) via, for example, the EPG.

In one embodiment of the invention, the programming choices of the group members are weighted. That is, rather than simply a like/dislike association with a particular programming interest, members of the group express a level of preference for each of a plurality of programming interests. The weighting factors associated with programming interest are optionally associated with any weighting mechanism, such as integer scales of 1-5, 1-10 and so on. The weightings may also be determined as strongly dislike, dislike, neutral, prefer and strongly prefer. All that is necessary in these embodiments is that the weighting factors employed are useful in allowing group member expression of various levels of preference for different programming types or interests.

In one embodiment of the invention, the individual group members are weighted. That is, the preferences of one or more members of the group may be given more weight than the preferences of other members. Specifically, within the context of a group each member is optionally associated with a priority level or ranking. Thus, the preferences of higher ranked or prioritized group members are more influential in the recommendation process than the preferences of lower ranked or prioritized group members.

In one embodiment of the invention, the content attribute weighting is provided. Thus, higher ranked or prioritized content attributes are more influential in the recommendation process than the preferences of lower ranked or prioritized content attributes. Content attributes may comprise programming genre, director, actors, content/programming affinity with a demographic group, MPAA rating, content format such as high definition TV (HDTV) or standard definition TV (SDTV) and so on.

The various weighting factors, preferences, affinities, group memberships and the like discussed herein are stored in, for example, the user profile database 120.

The utilization of group recommendations may comprise, illustratively, the removal or hiding from view of content offerings associated with non-group programming interests. Thus, in the above example, only those programming or content selections that are associated with a comedy programming interest are displayed when for example, a corresponding "group recommendation" selection or filter is invoked.

Thus, in en electronic program guide (EPG) or other service application according to an embodiment of the invention, a group recommendation feature is provided so that members of the group may quickly find programming that is compatible with the group.

In one embodiment of the invention, a program navigation method for, via an Electronic Program Guide (EPG), enabling a program viewer/user to locate and link to programs comprises utilizing programming preferences of each member of a group to determine a group profile, programming recommendations according to the group profile and adapting the operation of the EPG in response to the determined program recommendations. This embodiment is optionally adapted according to the various techniques described herein.

Figure 2:
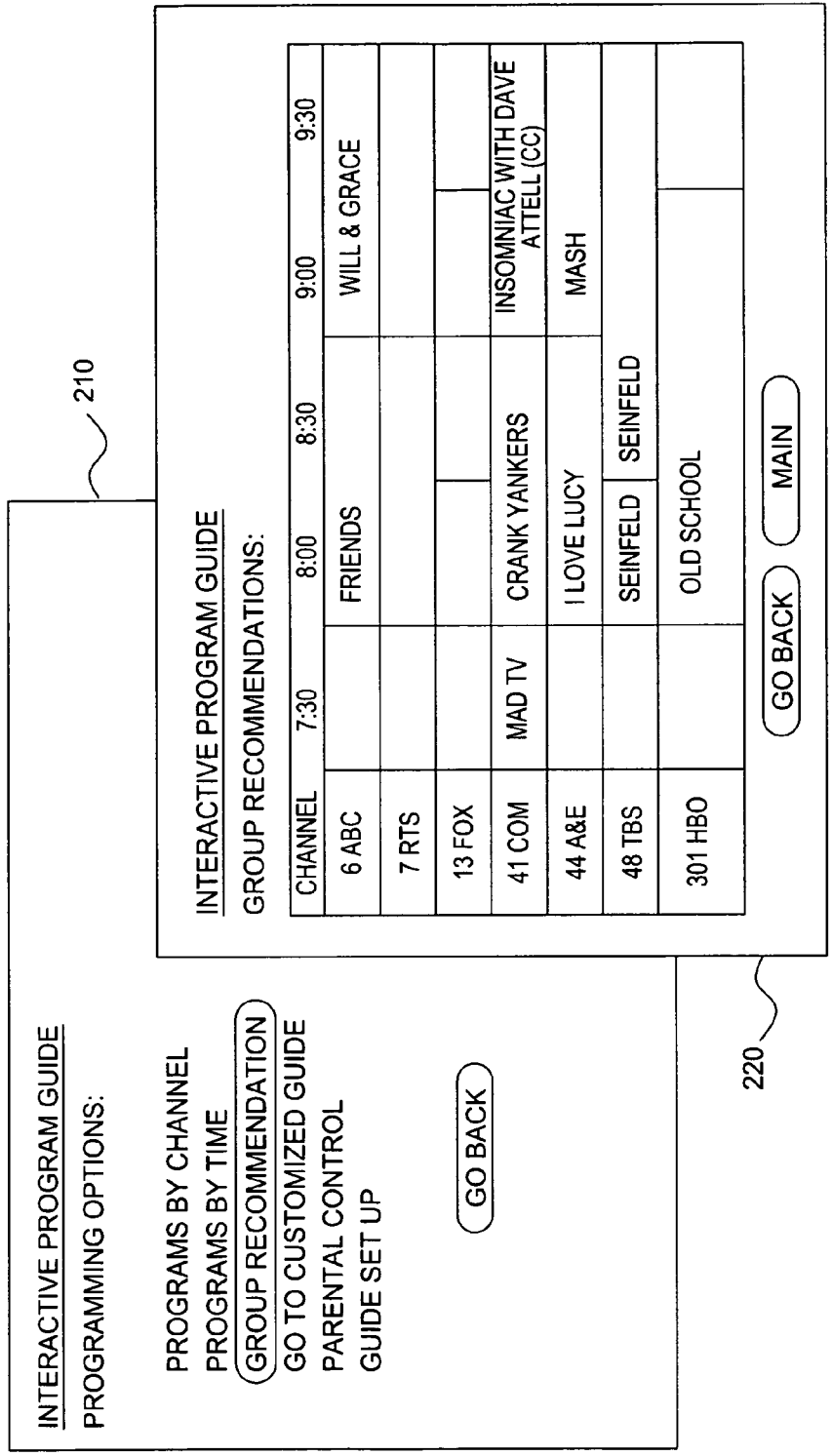

FIG. 2 depicts exemplary imagery associated with an electronic program guide (EPG) according to an embodiment of the invention. Specifically, FIG. 2 depicts two EPG display screens or pages, each page being associated with a particular EPG context or function.

A first EPG page 210 graphically depicts for a user a plurality of selections within a "Programming Options" context. User selection of a programming option (e.g., by manipulating a remote control to highlight and select the desired option) will cause the EPG to transition to a page or context associated with the selected option. The depicted options are "Programs by Channel," "Programs by Time," "Group Recommendation" and so on. The "Group Recommendation" option is depicted as being highlighted in the first EPG page 210 of FIG. 2.

A second EPG page 220 graphically depicts for a user a plurality of selections within a "Group Recommendation" context. Specifically, upon user selection of the option "Group Recommendation," the context of the EPG shifts from the first page 210 to the second page 220. It is noted that the second page 220 denotes group recommendations (illustratively Comedy programming only) by populating an available programming grid of channel content over several time periods with only the group recommended content (i.e., the comedy programming).

Thus, the present invention provides a media content search and filtering system for an EPG that presents search results in an easily viewable manner. In addition to depopulating an EPG page (such as discussed above with respect to the second EPG page 220 of FIG. 2), other EPG page presentation modes may be utilized.

FIG. 3 depicts an alternate embodiment of the second EPG page 220 of FIG. 2. Specifically, in the EPG page 300 of FIG. 3 the cells of the recommended programs that are positively selected by the searching operation are shown having an easily identifiable or delineating indicia than those cells that were not positively selected. The delineating indicia provides a visual emphasis and may be any visual identifying means that allows the user to quickly identify, on the display, those cells which were positively selected as opposed to those cells which were not positively selected. Examples of such delineating indicia may be cells having a differing color, cells having a differing brightness, cells having a differing shape, cells having embedded text that were not positively selected being erased from view, text within the cells having differing fonts, font sizes and/or styles such as bold, or italics lettering, or the like.

This mode of operation allows easy user identification of recommended programs. In one embodiment, non-recommended programs are not completely erased/hidden from the EPG page. That is, non-recommended programs are partially viewable to the user such that the use may select a non-recommended program for viewing if desired. Identification of non-positively selected programs optionally enables further tailoring of the search criteria, wherein the user may modify the criteria and then perform the search operation a second time in order to obtain more exacting results.

FIGS. 4-5 depict an alternate embodiments of the second EPG page 220 of FIG. 2. Specifically, in the EPG page 400 of FIG. 4 the cells of the rows of the EPG page associated with channels not having recommended programming within the viewable time frame are hidden. In the EPG page 500 of FIG. 5, the cells of the columns of the EPG page associated with time slots not having recommended programming within the viewable channels are hidden. In this manner, the search or filtering results shown on the EPG may be effectively compressed into an easily navigable display for the user. Thus ease of use is further enhanced by not requiring the perusal of rows (channels) and/or columns (time slots) from which no programs were selected/recommended.

The display techniques of FIGS. 2-5 may be combined in any way to effect a useful display of recommended programming. In addition, an optional cell movement mode is provided wherein a highlighted cell movement function allows quick movement to a cell having a positively selected program by skipping those cells without such a program. That is, using the highlighted cell movement function provided by an EPG, the movement function may be adapted to 'jump' across or skip over unselected rows or columns such that fewer numbers of input key presses or iterations are required by the user in order to find a particular interesting program from among the positively selected list of recommended programs. Thus, user interaction indicative of a desire to select an empty cell will result in user selection instead of the next non-empty cell in the "direction" of the selection (e.g., horizontally to the next time slot with content or vertically to the next channel with content).

In one embodiment of the invention, viewers or users may "opt in" to a particular group. That is, viewers who are not normally part of, for example, a household or group may join that household or group and thereby influence the recommendation process. The opt-in user and/or the user's preferences may be weighted or otherwise given a lower or higher priority as discussed above. The user may be present with the group or participating from his or her own set-top box. In this manner, group affinity may be provided to non-household members of, for example, church groups or other groups.

Referring also to FIG. 1, in one embodiment a plurality of set-top boxes 140, such as those found within a single house, are also responsive to a common control device 160. The control device 160 may comprise a computer, a wireless controller, a network device and the like. The control device 160 and set-top boxes 140 communicate via an appropriate communications medium or channel, such as a wireline or wireless network, an infrared link, an internet connection and the like. Generally speaking, transmit and receive circuitry associated with the set-top boxes 140 and control device 160 are compatible with the communications medium and each other. The control device, as well as the set-top box(es), is optionally enabled to allow user entry of programming preferences.

In one embodiment of the invention, a client application executed at the set-top box solicits input data and control command from a user via a remote control or other device, such as the above-described common control device 160. The input data and control commands are encapsulated as Internet Protocol (IP) packets and sent to the service provider via a DOCSIS return channel. A server application (e.g., a recommendation engine 125) provides return data such as recommendations, EPG pages and the like to the set-top box via, for example, data encapsulated in an MPEG transport stream. Within the set-top box, various applications may utilize the recommendation data. It is noted that the recommendation engine may be operative within the server, within a set top box, within a content provider or within some other functional portion associated with the system.

Within the context of the present invention, the terms set top box, set top terminal and the like should be broadly construed as a client device that communicates with a server to process received information streams (e.g., content or control streams) to provide output signals adapted for display. The set top box may be a stand-alone box or may be incorporated into a display device. The set top box or client device may communicate with other client devices.

As previously noted, the recommendation engine aggregates user profiles for the users in a group to determine a group profile. The group profile is then used to select (or filter out) content depending on how well the content conforms to the group profile. Thus, the recommendation engine provides a user profile or criteria aggregation function to in which the profiles associated with each member of a group are optionally weighted (in terms of user priority, content priority and the like) and aggregated to provide a group profile or selection criteria. The group profile is used to select appropriate content, which content is then offered via, for example, an EPG page or pages. Position or prominence within the EPG page(es) is optionally adapted in response to the above described bidding process such that a content provider or distributor may pay to have content or channel listings displayed in a more prominent manner.

One embodiment of the invention is implemented as a program product for use with a computer system such as, for example, the cable head end or client device/set top terminal processing elements described herein. The program(s) of the program product defines functions of the invention embodiments and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive) and/or (ii) alterable information stored on writable storage media (e.g., floppy disks within a diskette drive or hard-disk drive).

Variations and modifications of the present invention are possible, given the above description. However, all variations and modifications which are obvious to those skilled in the art to which the present invention pertains are considered to be within the scope of the protection granted by this Letters Patent.

What is claimed is:

1. A program navigation method, the method comprising:
providing a plurality of set top boxes coupled to a service provider, each set top box providing an electronic program guide (EPG);
obtaining, at each set top box of the plurality of set top boxes, identification of a set top box user, characteristic information associated with the identified user and viewing history information associated with the identified user;
storing, at each set top box of the plurality of set top boxes coupled to the service provider, the obtained user identification, characteristic information and viewing history to create a user profile associated with each set top box coupled to the service provider;
periodically uploading user profiles from each set top box of the plurality of set top boxes coupled to the service provider;
aggregating all uploaded user profiles from the plurality of set top boxes in a database;
invoking a group recommendation feature in the EPG of each set top box of the plurality of set top boxes;
in response to the invocation of the group recommendation feature, providing the service provider a group identity for identifying a user defined group associated with the users of the plurality of set top boxes, the user defined group allowing each of the users of the plurality of set top boxes to actively select to be included in or excluded from the user defined group;
utilizing programming preferences of each user profile aggregated for the user defined group to determine a group profile for the user defined group of the plurality of set top boxes;
comparing, at a recommendation engine at the service provider, the user profile of a requesting user of one set top box associated with the user defined group to the determined group profile of the user defined group of the plurality of set top boxes to determine programming recommendations for the requesting user of the one set top box in conformance with the group profile of the user defined group of the plurality of set top boxes;
adapting the EPG of the one set top box of the requesting user in response to the determined program recommendations, thereby enabling the requesting user of the one set top box to locate and link to one or more of the determined program recommendations; and
delivering the adapted EPG from the recommendation engine at the service provider to the one set top box of the requesting user associated with the user defined group of the plurality of set top boxes, wherein the adapted EPG by using a highlighted cell movement function is able to skip over unselected rows or columns so that the user can quickly navigate to a positively selected list of recommended programs.

2. The method of claim 1, wherein, the adapting comprises providing an EPG page including only the determined programming recommendations for the user defined group.

3. The method of claim 1, wherein, the adapting comprises providing an EPG page wherein the determined programming recommendations are associated with one or more of a different color, a different brightness and a different shape.

4. The method of claim 1, wherein, the adapting comprises providing an EPG page wherein the determined programming recommendations are associated with delineating indicia to identify the determined programming recommendations.

5. The method of claim 2, wherein, the EPG page includes a grid of display cells, each of the display cells being associated with programming of a respective channel during a respective time period and wherein the adapting comprising displaying only these channels including programming recommendations during the respective time period.

6. The method of claim 2, wherein the EPG page includes a grid of display cells, each of the display cells being associated with programming of a respective channel during a respective time period and wherein the adapting comprising displaying only time periods including programming recommendations.

7. The method of claim 5, wherein the adapting comprising displaying only time periods including programming recommendations.

8. The method of claim 1, wherein the adapting further comprises displaying programming recommendations according to a preferential order.

9. The method of claim 8, wherein the displaying programming recommendations according to a preferential order further comprising displaying content in the EPG page in a position of prominence in response to payment made on behalf of an owner of the content.

10. The method of claim 1, wherein each member of the group of users is associated with a priority weighting provided by a user identifying a weight for each member of the user defined group and wherein the programming recommendations delivered to the set-top box of the user are adapted in response to the relative priority weightings of the members of the user defined group.

11. The method of claim 1, wherein content attributes are associated with a priority weighting and wherein the group profile is adapted in response to the relative priority weightings of the content attributes.

12. The method of claim 1, wherein the utilizing programming preferences of each member of the group of users in the user defined group further comprises receiving programming preferences via user interaction with one or more of a set-top box and a computer.

13. The method of claim 1, wherein the adapting of the EPG page is performed for each of a plurality of set-top boxes associated with the group of users in the user defined group.

14. The method of claim 13 further comprising controlling each of the plurality of set-top boxes associated with the group of users in the user defined group using a common control device.

15. A system having a service provider for enabling a user to locate and link to programs, the user being a member of a user defined group, the system comprising:
a plurality of set top boxes coupled to the service provider; each of the set top boxes providing an electronic program guide (EPG) and associated with a user;
a user profile database, for storing periodically uploaded user profiles associated with each set top box of the plurality of set top boxes based on obtained identification of a set top box user, characteristic information associated with the identified user and viewing history information associated with the identified user aggregating all uploaded user profiles and, in response to an invocation of a group recommendation feature in the EPG of each set top box of the plurality of set top boxes, receiving a group identity from the set-top box of the user for identifying a user defined group of the plurality of set top boxes, the user defined group allowing each of the users of the plurality of set top boxes to actively select to be included in or excluded from the user defined group of the plurality of set top boxes; and
a recommendation engine, for utilizing programming preferences of each user profile aggregated for the user defined group of the plurality of set top boxes to determine a group profile for the user defined group of the plurality of set top boxes and for comparing the user profile of a requesting user of one set top box associated with the user defined group of the plurality of set top boxes to the determined group profile of the user defined group of the plurality of set top boxes to determine programming recommendations in conformance with the group profile of the user defined group of the plurality of set top boxes;
wherein the recommendation engine adapts the EPG of the user of the one set top box of the plurality of set top boxes in response to the determined program recommendations for the user defined group of the plurality of set top boxes thereby enabling the user of the one set top box to locate and link to one or more of the determined program recommendations using the adapted EPG from the recommendation engine to the one set top box of the requesting user associated with the user defined group of the plurality of set top boxes, wherein the adapted EPG by using a highlighted cell movement function is able to skip over unselected rows or columns so that the user can quickly navigate to a positively selected list of recommended programs.

16. A non-transitory computer readable storage medium for storing a program product, comprising a computer readable code for causing a computer to perform a method comprising:
obtaining from each set top box of a plurality of set top boxes coupled to a service provider identification of a set top box user, characteristic information associated with the identified user and viewing history information associated with the identified user;
storing, at each set top box of the plurality of set top boxes coupled to the service provider, the obtained user identification, characteristic information and viewing history to create a user profile associated with each set top box coupled to the service provider;
periodically uploading user profiles from each set top box of the plurality of set top boxes coupled to the service provider;
aggregating all uploaded user profiles from the plurality of set top boxes in a database;
invoking a group recommendation feature in an electronic program guide (EPG) of each set top box of the plurality of set top boxes;
in response to the invocation of the group recommendation feature, providing the service provider a group identity for identifying a user defined group associated with the users of the plurality of set top boxes, the user defined group allowing each of the users of the plurality of set top boxes to actively select to be included in or excluded from the user defined group;
utilizing programming preferences of each user profile aggregated for the user defined group to determine a group profile for the user defined group of the plurality of set top boxes;
comparing, at a recommendation engine at the service provider, the user profile of a requesting user of one set top box associated with the user defined group to the determined group profile of the user defined group of the plurality of set top boxes to determine programming recommendations for the requesting user of the one set top box in conformance with the group profile of the user defined group of the plurality of set top boxes;

adapting the EPG of the one set top box of the requesting user in response to the determined program recommendations, thereby enabling the requesting user of the one set top box to locate and link to one or more of the determined program recommendations; and delivering the adapted EPG from the recommendation engine at the service provider to the one set top box of the requesting user associated with the user defined group of the plurality of set top boxes, wherein the adapted EPG by using a highlighted cell movement function is able to skip over unselected rows or columns so that the user can quickly navigate to a positively selected list of recommended programs.

* * * * *